United States Patent
Muto et al.

(10) Patent No.: US 7,755,702 B2
(45) Date of Patent: Jul. 13, 2010

(54) APPARATUS AND METHOD FOR PROCESSING VIDEO SIGNAL

(75) Inventors: Yasuhiko Muto, Fukaya (JP); Hideo Tsurufusa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1026 days.

(21) Appl. No.: 11/366,425

(22) Filed: Mar. 3, 2006

(65) Prior Publication Data

US 2006/0197875 A1  Sep. 7, 2006

(30) Foreign Application Priority Data

Mar. 4, 2005  (JP) .............................. 2005-061437

(51) Int. Cl.
 *H04N 5/21* (2006.01)
 *H04N 5/213* (2006.01)
 *H04N 1/409* (2006.01)

(52) U.S. Cl. ........................ 348/607; 348/606; 348/627; 348/569; 348/563; 382/275; 382/268; 375/240.27

(58) Field of Classification Search ................. 348/607, 348/627, 606, 569, 563; 382/275, 268; 375/240.27
See application file for complete search history.

(56) References Cited

U.S. PATENT DOCUMENTS 5,781,247 A * 7/1998 Wehmeyer et al. .......... 348/569
7,450,182 B2 * 11/2008 Nakajima et al. ........... 348/625

FOREIGN PATENT DOCUMENTS

JP  2000-195173  7/2000
JP  2000-197014  7/2000

* cited by examiner

*Primary Examiner*—David L Ometz
*Assistant Examiner*—Jean W Désir
(74) *Attorney, Agent, or Firm*—Finnegan, Henderson, Farabow, Garrett & Dunner, L.L.P.

(57) ABSTRACT

According to one embodiment, an MPEG noise reduction processing unit which performs a process of reducing a mosquito noise to a received video signal can be controlled in a setting state corresponding to a desired item selected on the setting screen in which the plural items to be set are displayed as an option.

12 Claims, 6 Drawing Sheets

| Video adjustment | |
|---|---|
| Unicolor | 80 |
| Brightness | 85 |
| Black level | 00 |
| Color density | 00 |
| Shade | 00 |
| Image quality | 00 |
| Detailed adjustment | |
| Return to initial setting | |

⇕ Select with up or down key    Decide with decision key    Return to previous screen with return key

FIG. 7

| Detailed adjustment | |
|---|---|
| Color temperature | medium |
| Dynamic gamma | on |
| MPEG NR | off |
| DNR | auto |

⇕ Select with up or down key    Decide with decision key    Return to previous screen with return key

APPARATUS AND METHOD FOR PROCESSING VIDEO SIGNAL

CROSS-REFERENCE TO RELATED APPLICATIONS

This application is based upon and claims the benefit of priority from Japanese Patent Application No. 2005-061437, filed Mar. 4, 2005, the entire contents of which are incorporated herein by reference.

BACKGROUND

1. Field

One embodiment of the invention relates to a video signal processing apparatus and video signal processing method preferably used in a digital television broadcasting receiver and the like.

2. Description of the Related Art

Recently, as is well known, digitalization of the television broadcasting has been promoted. For example, not only satellite digital broadcasting such as BS (broadcasting satellite) digital broadcasting and 110 CS (communication satellite) digital broadcasting but also terrestrial digital broadcasting is started in Japan.

In the current digital television broadcasting, a compression coding process is performed to a video signal by an MPEG (moving picture experts group) method to perform the digital broadcasting. An MPEG decoding process is performed to the video signal received by the digital broadcasting receiver to display the video.

When the video signal to which the compression and expanding process is performed by the MPEG method is displayed on a screen, it is well known that a so-called mosquito noise in which fine points blink on the display screen is generated. The mosquito noise is easy to generate as a compression rate is increased. The mosquito noise is easily visible in a still image rather than a moving picture.

Jpn. Pat. Appln. KOKAI Publication No. 2000-197014 discloses a configuration in which a noise reduction level of a three-dimensional noise reduction processing unit can be adjusted in a step manner by rotating a jog shuttle, when a noise reduction process is performed to a reproducing signal of digital versatile disk (DVD) by the three-dimensional noise reduction processing unit.

Jpn. Pat. Appln. KOKAI Publication No. 2000-195173 discloses a configuration in which DVD identification information and the noise reduction level are stored while associated with each other and the noise reduction process is automatically performed at the noise reduction level stored in loading DVD, when the noise reduction process is performed to the reproducing signal of DVD by the three-dimensional noise reduction processing unit which can set the noise reduction level.

However, in Jpn. Pat. Appln. KOKAI Publication Nos. 2000-197014 and 2000-195173, there is no description about handling of the mosquito noise particularly generated in the case where the video signal to which the compression and expanding process by the MPEG method is performed is displayed on the screen.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an MPEG noise reduction processing unit which performs a process of reducing a mosquito noise to a received video signal can be controlled in a setting state corresponding to a desired item selected on the setting screen in which the plural items to be set are displayed as an option.

Figure 1:
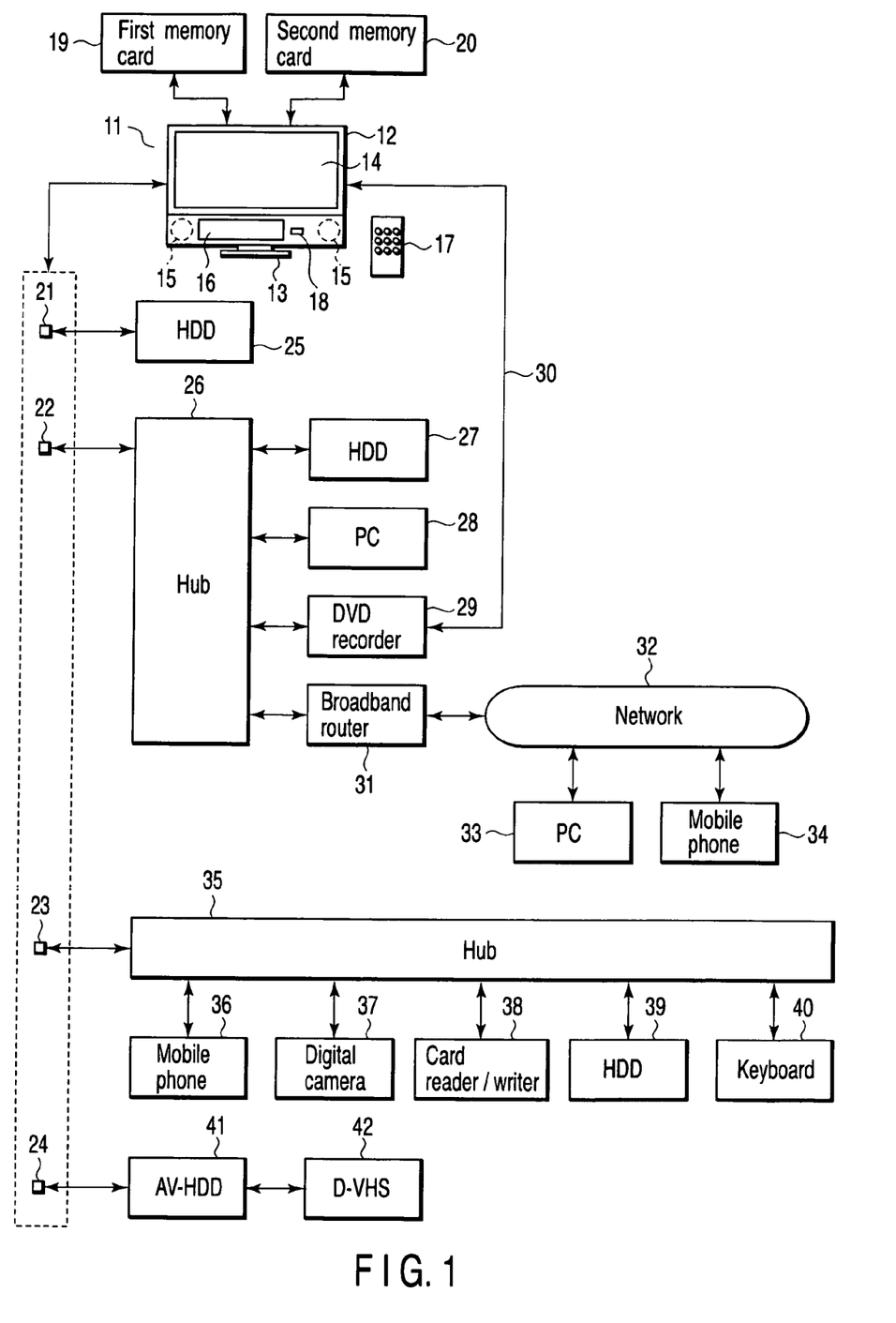
FIG. 1 shows an embodiment of the invention, and schematically shows a digital television broadcasting receiver and an example of a network system mainly formed thereby.

FIG. 1 schematically shows an appearance of a digital television broadcasting receiver 11 described in the embodiment and an example of a network system mainly formed by the digital television broadcasting receiver 11.

The digital television broadcasting receiver 11 mainly includes a thin-shaped cabinet 12 and a support board 13 which supports the cabinet 12 while making the cabinet 12 uprising. The cabinet 12 includes a flat-panel type video display unit 14, a speaker 15, an operation unit 16, and a photo-receiving unit 18. For example, the video display unit 14 includes a liquid crystal display panel. The photo-receiving unit 18 receives operation information transmitted from a remote controller 17.

A first memory card 19 such as a secure digital (SD) memory card and multi-media card (MMC) is detachably attached to the digital television broadcasting receiver 11, and information such as a program and a photograph is recorded in and reproduced from the first memory card 19.

A second memory card (IC card) 20 is also detachably attached to the digital television broadcasting receiver 11, and the information is recorded in and reproduced from the second memory card 20. A semiconductor memory in which contract information and the like, for example, are recorded is incorporated into the second memory card 20.

The digital television broadcasting receiver 11 includes a first local area network (LAN) terminal 21, a second LAN terminal 22, a universal serial bus (USB) terminal 23, and an i.Link terminal 24.

The first LAN terminal 21 is used as a LAN-compatible hard disk drive (HDD) dedicated port, and used to perform the recording and reproduction of the information to a LAN-compatible HDD 25 which is the connected network attached storage (NAS) through Ethernet (registered trademark).

Thus, the provision of the first LAN terminal 21 as the LAN-compatible HDD dedicated port enables program information to be stably recorded in the HDD 25 with high-definition image quality without being influenced by other network environments, network use status and the like.

The second LAN terminal 22 is used as a general LAN-compatible port for utilizing the Ethernet (registered trademark). For example, the second LAN terminal 22 is used to connect devices such as a LAN-compatible HDD 27, a personal computer (PC) 28, an HDD-built-in DVD recorder 29 to the digital television broadcasting receiver 11 through a hub 26 to perform information transmission with the devices.

For the DVD recorder 29, since the digital information communicated through the second LAN terminal 22 is the information only on a control system, it is necessary to provide a dedicated analog transmission line 30 in order to transmit analog video and sound information with the digital television broadcasting receiver 11.

The second LAN terminal 22 is connected to a network 32 such as the Internet through a broadband router 31 connected to the hub 26, and used to perform the information transmission with a PC 33, a mobile phone 34, and the like through the network 32.

The USB terminal 23 is used as a general USB-compatible port. For example, the USB terminal 23 is connected to USB devices such as a mobile phone 36, a digital camera 37, a card reader/writer 38 for the memory card, an HDD 39, and a keyboard 40 through a hub 35, and used to perform the information transmission with the USB devices.

The i.Link terminal 24 establishes serial connection with, e.g., an AV-HDD 41, a digital (D)-video home system (VHS) 42, and a terrestrial digital tuner (not shown) to perform the information transmission with these devices.

Figure 2:
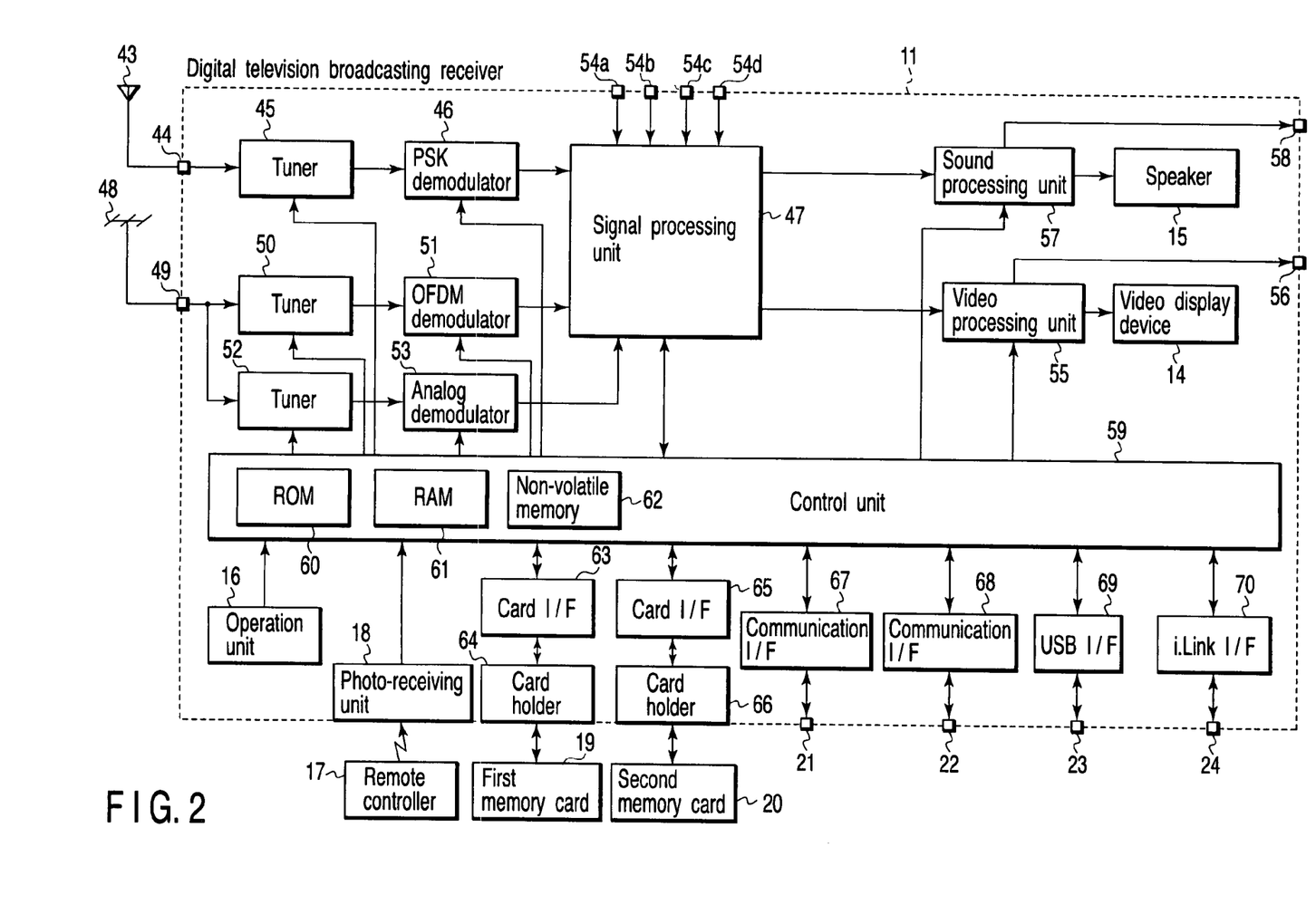
FIG. 2 is a block diagram showing a main signal processing system of the digital television broadcasting receiver in the embodiment.

FIG. 2 shows a main signal processing system of the digital television broadcasting receiver 11. A satellite digital television broadcasting signal received by a BS/CS digital broadcasting receiving antenna 43 is supplied to a satellite digital broadcasting tuner 45 through an input terminal 44 to select the broadcasting signal of the desired channel.

The broadcasting signal selected by the tuner 45 is supplied to a phase shift keying (PSK) demodulator 46, and the broadcasting signal is demodulated in the digital video signal and the digital sound signal. Then, the digital video signal and the digital sound signal are outputted to a signal processing unit 47.

A terrestrial digital television broadcasting signal received by a terrestrial broadcasting receiving antenna 48 is supplied to a terrestrial digital broadcasting tuner 50 through an input terminal 49 to select the broadcasting signal of the desired channel.

The broadcasting signal selected by the tuner 50 is supplied to an orthogonal frequency division multiplexing (OFDM) demodulator 51, and the broadcasting signal is demodulated in the digital video signal and the digital sound signal. Then, the digital video signal and the digital sound signal are outputted to the signal processing unit 47.

A terrestrial analog television broadcasting signal received by the terrestrial broadcasting receiving antenna 48 is supplied to a terrestrial analog broadcasting tuner 52 through the input terminal 49 to select the broadcasting signal of the desired channel. The broadcasting signal selected by the tuner 52 is supplied to an analog demodulator 53, and the broadcasting signal is demodulated in the analog video signal and the analog sound signal. Then, the analog video signal and the analog sound signal are outputted to the signal processing unit 47.

The signal processing unit 47 is connected to plural input terminals 54$a$, 54$b$, 54$c$, and 54$d$ (four input terminals in FIG. 2). The input terminals 54$a$ to 54$d$ enable the analog video signal and the analog sound signal to be inputted from the outside of the digital television broadcasting receiver 11.

The signal processing unit 47 selectively performs predetermined digital signal processing to the digital video signals and the digital sound signals, which are supplied from the PSK demodulator 46 and the OFDM demodulator 51, respectively.

The signal processing unit 47 selectively digitizes the analog video signals and the sound signals, which are supplied from the analog demodulator 53 and the input terminals 54$a$ to 54$d$, respectively, and the signal processing unit 47 performs the predetermined digital signal processing to the digitized video signals and the digitized sound signals.

Examples of the digital signal processing performed by the signal processing unit 47 include an MPEG decoding process for the video signal, an MPEG noise reduction process of decreasing a mosquito noise generated in association with the MPEG decoding process, a process of superimposing an on screen display (OSD) signal on the video signal, a scaling process for the video signal, and a decoding process for the sound signal.

The digital video signal outputted from the signal processing unit 47 is supplied to a video processing unit 55. After the video processing unit 55 converts the inputted digital video signal into the analog video signal having a format which can be displayed by the video display unit 14, the video processing unit 55 derives the analog video signal to the outside through an output terminal 56 while outputting the analog video signal to the video display unit 14 to perform the video display.

The digital sound signal outputted from the signal processing unit 47 is supplied to a sound processing unit 57. After the sound processing unit 57 converts the inputted digital sound signal into the analog sound signal having the format which can be reproduced by the speaker 15, the sound processing unit 57 derives the analog sound signal to the outside through an output terminal 58 while outputting the analog sound signal to the speaker 15 to reproduce the sound.

A control unit 59 controls the whole operations including the above various receiving operations of the digital television broadcasting receiver 11. A central processing unit (CPU) and the like are built in the control unit 59. The control unit 59 receives operation information from the operation unit 16 or receives operation information sent from the remote controller 17 through the photo-receiving unit 18, and the control unit 59 controls each unit such that contents of the operation are reflected.

In this case, the control unit 59 mainly utilizes a read only memory (ROM) 60 in which a control program executed by the CPU is stored, a random access memory (RAM) 61 which supplies a working area to the CPU, and a non-volatile memory 62 in which various kinds of setting information and control information are stored.

The control unit 59 is connected to a card holder 64 through a card interface (I/F) 63. The first memory card 19 can be attached to the card holder 64. Therefore, the control unit 59 can perform the information transmission with the first memory card 19 attached to the card holder 64 through the card I/F 63.

The control unit 59 is connected to a card holder 66 through a card I/F 65. The second memory card 20 can be attached to the card holder 66. Therefore, the control unit 59 can perform the information transmission with the second memory card 20 attached to the card holder 66 through the card I/F 65.

The control unit 59 is connected to the first LAN terminal 21 through a communication I/F 67. Therefore, the control unit 59 can perform the information transmission with the LAN-compatible HDD 25 connected to the first LAN terminal 21 though the communication I/F 67. In this case, the control unit 59 has a dynamic host configuration protocol (DHCP) server function, and the control unit 59 performs the control while allocating an internet protocol (IP) address to the LAN-compatible HDD 25 connected to the first LAN terminal 21.

The control unit 59 is connected to the second LAN terminal 22 through a communication I/F 68. Therefore, the control unit 59 can perform the information transmission with the devices (see FIG. 1) connected to the second LAN terminal 22 through the communication I/F 68.

The control unit 59 is connected to the USB terminal 23 through the USB I/F 69. Therefore, the control unit 59 can perform the information transmission with the devices (see FIG. 1) connected to the USB terminal 23 through the USB I/F 69.

The control unit 59 is connected to the i.Link terminal 24 through an i.Link I/F 70. Therefore, the control unit 59 can perform the information transmission with the devices (see FIG. 1) connected to the i.Link terminal 24 through the i.Link I/F 70.

Figure 3:
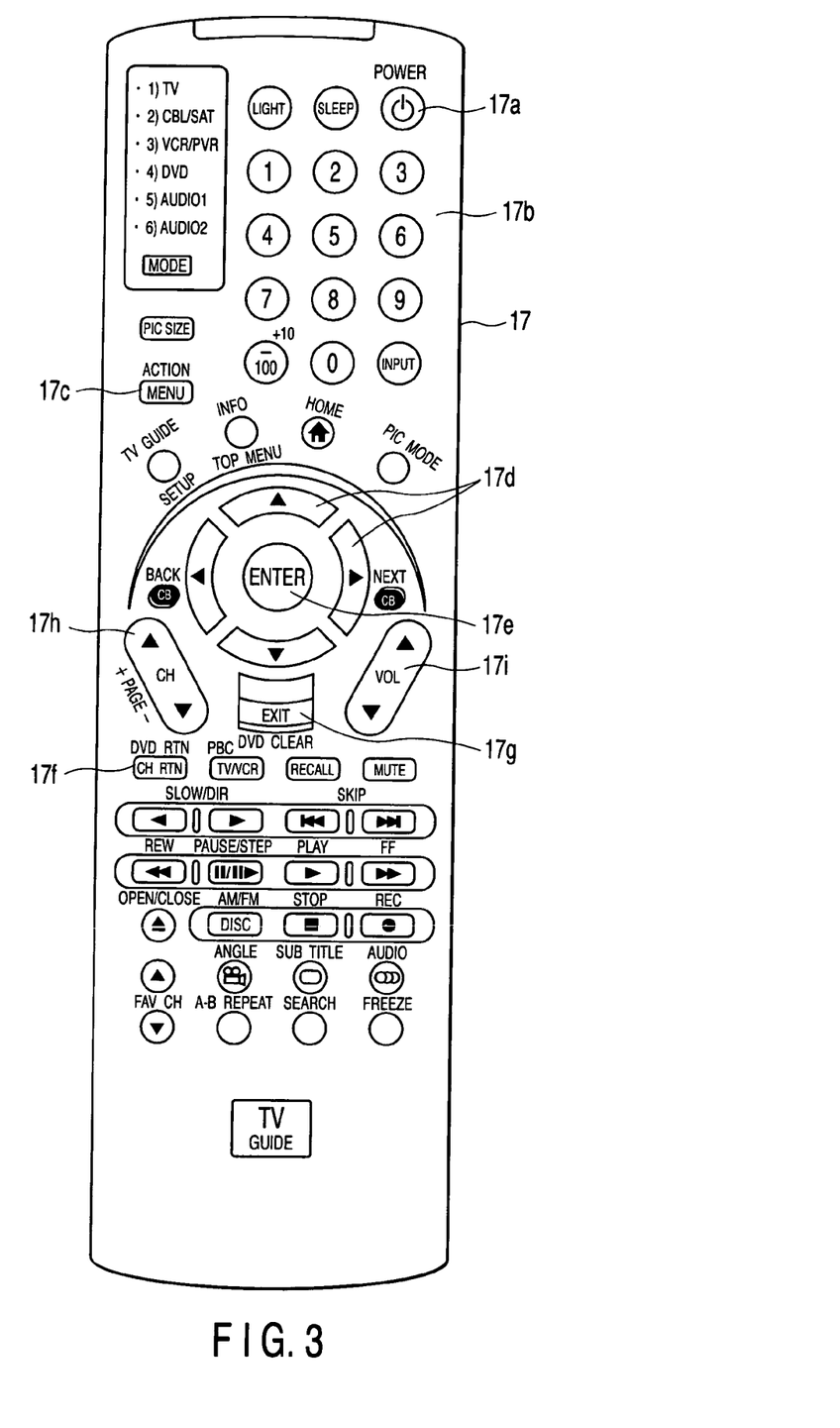
FIG. 3 shows a remote controller of the digital television broadcasting receiver in the embodiment.

FIG. 3 shows an appearance of the remote controller 17. The remote controller 17 mainly includes a power key 17*a*, a ten key 17*b*, a menu key 17*c*, a cursor key 17*d*, a enter key 17*e*, a return key 17*f*, an exit key 17*g*, a channel up and down key 17*h*, and a volume adjustment key 17*i*.

Figure 4:
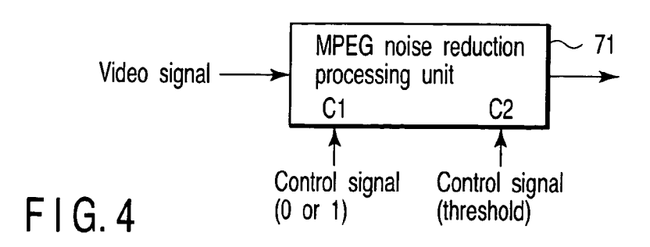
FIG. 4 is a block diagram showing an MPEG noise reduction processing unit of the digital television broadcasting receiver in the embodiment.

An MPEG noise reduction process performed by the signal processing unit 47 will be described below. As shown in FIG. 4, the MPEG noise reduction process is performed by supplying the video signal to an MPEG noise reduction processing unit 71 incorporated into the signal processing unit 47.

In this case, the MPEG noise reduction processing unit 71 includes two control terminals C1 and C2. When a control signal having a logical value of 0 is supplied to the control terminal C1, the MPEG noise reduction processing unit 71 becomes an off state in which the noise reduction process is stopped, and the MPEG noise reduction processing unit 71 is operated so as to directly output the inputted video signal.

When the control signal having the logical value of 1 is supplied to the control terminal C1, the MPEG noise reduction processing unit 71 is operated so as to become an on state in which the process of reducing the mosquito noise is performed to the inputted video signal.

In the noise-reduction-process on state in which the control signal having the logical value of 1 is supplied to the control terminal C1, the MPEG noise reduction processing unit 71 can change an intensity level of the noise reduction process among "weak", "average", and "strong" by the control signal supplied to the control terminal C2.

In this case, a threshold for setting which intensity level of the noise reduction process is performed to the video signal is used as the control signal supplied to the control terminal C2. That is, the intensity level of the noise reduction process can be changed at three stages by selectively imparting three kinds of the thresholds which are the control signal.

The control signals are generated by the control unit 59 according to the setting operation of the user. The control signals are supplied to the control terminals C1 and C2 of the MPEG noise reduction processing unit 71.

That is, the digital television broadcasting receiver 11 is configured such that the on state or the off state of the process of reducing the mosquito noise can be set by the user operation, and such that the intensity level of the noise reduction process in the on state can be set by the user operation.

Figure 5:
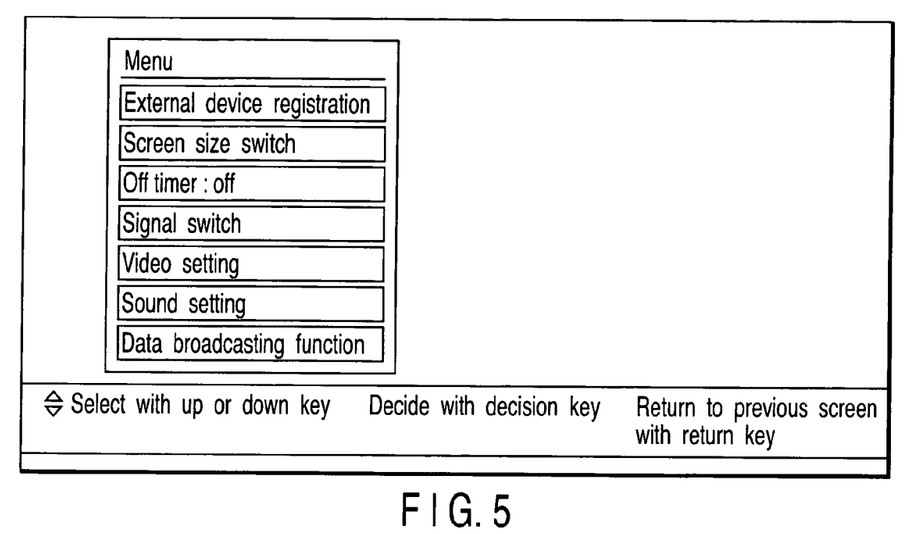
FIG. 5 is a view for explaining an example of a quick menu displayed by the digital television broadcasting receiver in the embodiment.

Specifically, a menu screen shown in FIG. 5 is displayed on the screen of the video display unit 14 by operating the menu key 17*c* of the remote controller 17. Seven items of "external device registration", "screen size switch", "off timer", "signal switch", "video setting", "sound setting", and "data broadcasting function" are displayed as an option in the menu screen.

In the menu screen, the desired item is selected by operating the cursor key 17*d* of the remote controller 17, and the selected item is determined by operating the enter key 17*e*. In this case, the item of "video setting" is selected and determined.

Figure 6:
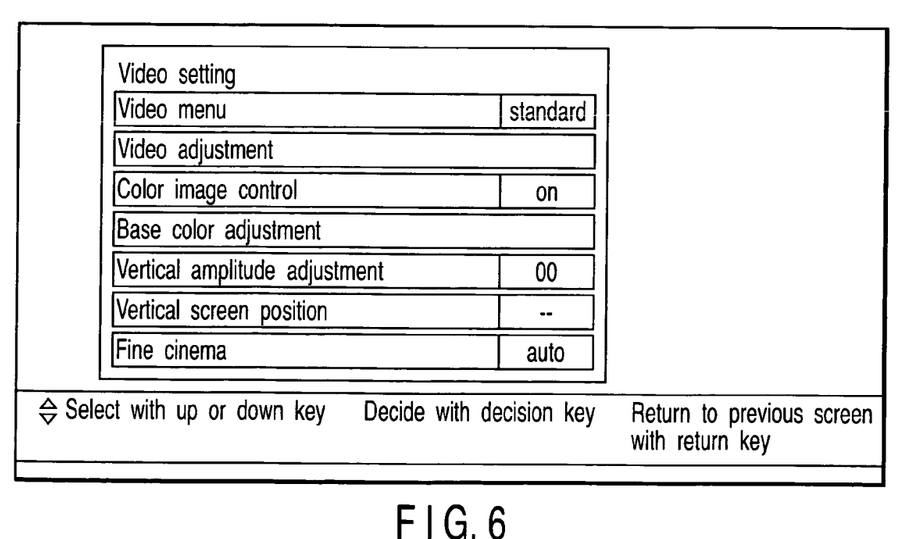
FIG. 6 is a view for explaining an example of a video setting screen displayed by the digital television broadcasting receiver in the embodiment.

Then, a video setting screen shown in FIG. 6 is displayed on the screen of the video display unit 14. Seven items of "video menu", "video adjustment", "color image control", "base color adjustment", "vertical amplitude adjustment", "vertical screen position", and "fine cinema" are displayed as the option in the video setting screen. In the video setting screen, the item of "video adjustment" is selected by operating the cursor key 17*d* of the remote controller 17, and the enter key 17*e* is operated.

Figure 7:
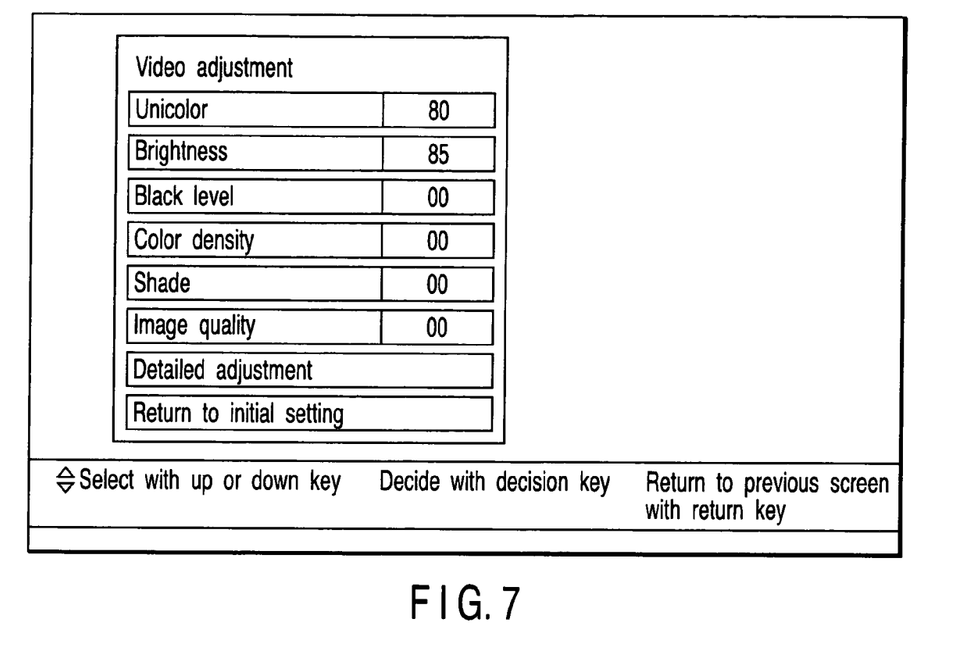
FIG. 7 is a view for explaining an example of a video adjustment screen displayed by the digital television broadcasting receiver in the embodiment.

As a result, a video adjustment screen shown in FIG. 7 is displayed. Eight items of "unicolor", "brightness", "black level", "color density", "shade", "image quality", "detailed adjustment", and "return to initial setting" are displayed as the option in the video adjustment screen. In the video adjustment screen, the item of "detailed adjustment" is selected by operating the cursor key 17*d* of the remote controller 17, and the enter key 17*e* is operated.

Figure 8:
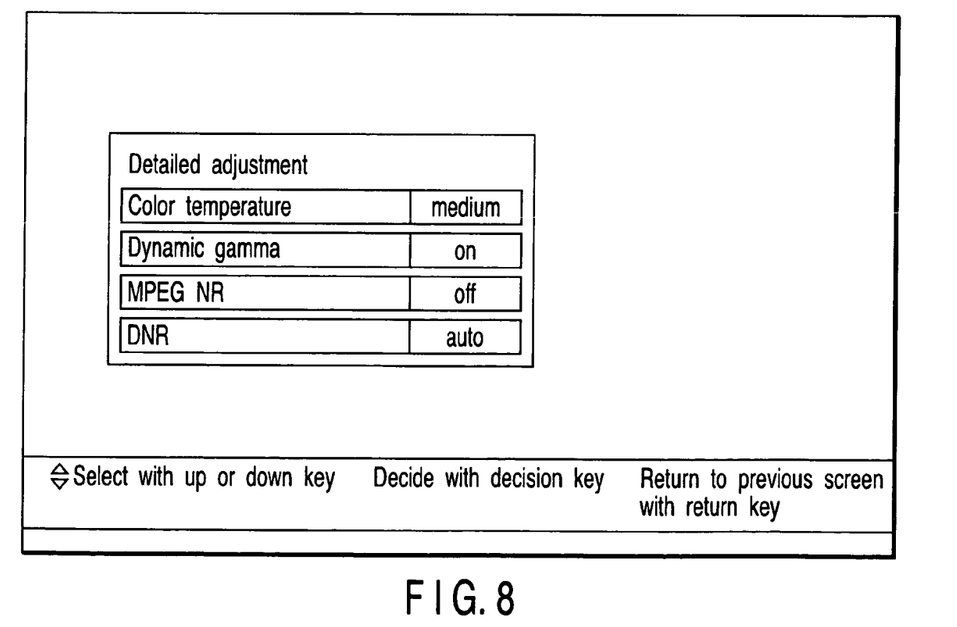
FIG. 8 is a view for explaining an example of a detailed adjustment screen displayed by the digital television broadcasting receiver in the embodiment.

Then, a detailed adjustment screen shown in FIG. 8 is displayed. Four items of "color temperature", "dynamic gamma", "MPEG NR (noise reduction)", and "DNR" are displayed as the option in the detailed adjustment screen. In the detailed adjustment screen, the item of "MPEG NR" is selected by operating the cursor key 17*d* of the remote controller 17, and the enter key 17*e* is operated.

Figure 9:
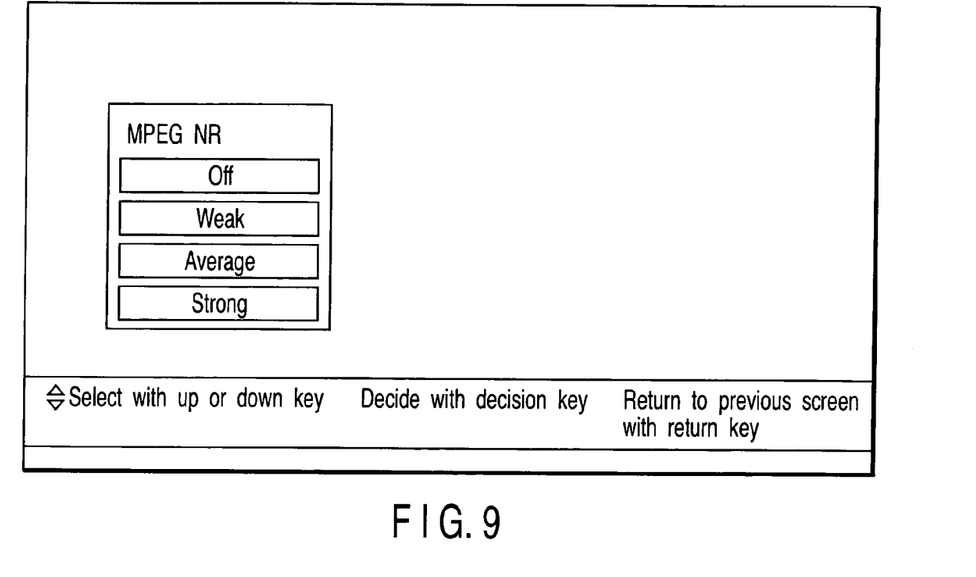
FIG. 9 is a view for explaining an example of a MPEG NR setting screen displayed by the digital television broadcasting receiver in the embodiment.

As a result, an MPEG NR setting screen shown in FIG. 9 is displayed. Four items of "off", "weak", "average", and "strong" are displayed as the option in the MPEG NR setting screen. In the MPEG NR setting screen, any one of the items is selected by operating the cursor key 17*d* of the remote controller 17, and the enter key 17*e* is operated.

In this case, for example, when the item of "off" is selected and determined, the control unit 59 supplies the control signal having the logical value of 0 to the control terminal C1 of the MPEG noise reduction processing unit 71, and the control unit 59 is operated so as to set the noise reduction process at the off state.

When any one of the items of "weak", "average", and "strong" is selected and determined, the control unit 59 supplies the control signal having the logical value of 1 to the control terminal C1 of the MPEG noise reduction processing unit 71 to set the noise reduction process at the on state, and the control unit 59 reads the threshold corresponding to the selected item from the ROM 60 to supply the threshold to the control terminal C2 as the control signal. As a result, the intensity level of the process of reducing the mosquito noise can be set.

In any of the screen display states shown in FIGS. 5 to 9, it is possible to directly return to the previous screen of the operation of the menu key 17c by operating the exit key 17g of the remote controller 17.

Figure 10:
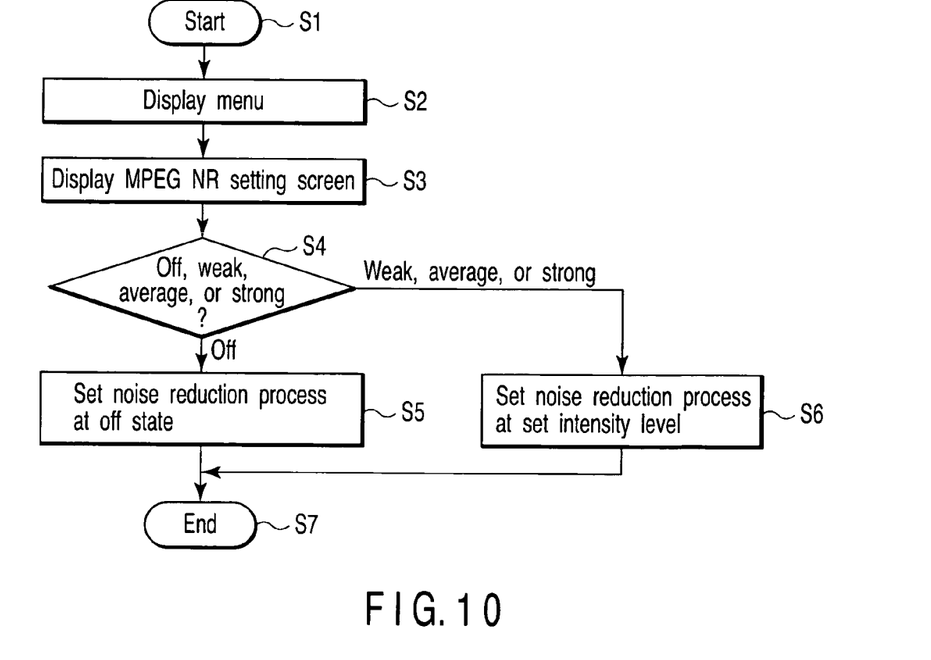
FIG. 10 is a flowchart for explaining a main process operation of the digital television broadcasting receiver in the embodiment.

FIG. 10 shows a flowchart summarizing various setting operations in the process of reducing the mosquito noise. More specifically, when the process is started (Block S1) by operating the menu key 17c of the remote controller 17, the control unit 59 causes the video display unit 14 to display the menu on the screen in Block S2.

In the operations of entering the various screens in a hierarchical structure whose top is the menu screen, in Block S3, the control unit 59 causes the video display unit 14 to display the MPEG NR setting screen by performing the predetermined operations from the menu screen shown in FIG. 5 to the MPEG NR setting screen shown in FIG. 9.

In Block S4, the control unit 59 judges whether the item of "off" or any one of the items of "weak", "average", and "strong" is selected and determined in the items displayed on the MPEG NR setting screen.

When the control unit 59 judges that the item of "off" is selected and determined, in Block S5, the control unit 59 supplies the control signal having the logical value of 0 to the control terminal C1 of the MPEG noise reduction processing unit 71 to set the process of reducing the mosquito noise at the off state. Then, the process is ended (Block S7).

When the control unit 59 judges that any one of the items of "weak", "average", and "strong" is selected and determined in Block S4, the control unit 59, in Block S6, supplies the control signal having the logical value of 1 to the control terminal C1 of the MPEG noise reduction processing unit 71, and the control unit 59 supplies the threshold corresponding to the selected item to the control terminal C2 to set the intensity level of the process of reducing the mosquito noise. Then, the process is ended (Block S7).

According to the embodiment, the MPEG noise reduction processing unit 71 which performs the process of reducing the mosquito noise is incorporated into the signal processing unit 47, so that the video signal processing apparatus can deal with the mosquito noise generated in the video signal to which the compression and expanding process is performed by the MPEG method.

Whether the process of reducing the mosquito noise is performed or not can be set by the user operation, and the intensity level of the mosquito noise reduction process can be set by the user operation, so that the video signal processing apparatus can appropriately deal with the mosquito noise at the practical level.

Sometimes the fine feeling of the video is lost when the noise reduction process is excessively performed to the mosquito noise, so that the user can select the off state or the proper intensity level of the noise reduction process while watching the display screen. Therefore, the video signal processing apparatus is highly convenient and useful for the user.

For the MPEG noise reduction processing unit 71, even if the control signal having the logical value of 0 is supplied to the control terminal C1 to set the noise reduction process at the off state, the noise reduction process is not completely stopped, but the noise reduction process having the extremely weak level may be performed. For example, the intensity level at which the noise reduction process is performed in the off state is determined according to a concept of the video which is a target of a manufacturer of the digital television broadcasting receiver 11.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal processing apparatus comprising:
    a receiving unit configured to receive a video signal;
    a processing unit comprising a first part for receiving a first control signal for setting the processing unit to (i) an off state in which a process of reducing a mosquito noise is stopped or (ii) an on state in which the process of reducing a mosquito noise is performed, and a second part for receiving a second control signal for setting an intensity level of the process of reducing a mosquito noise, the processing unit performing the process of reducing a mosquito noise to the video signal received by the receiving unit, based on the first control signal and the second control signal;
    a selection unit configured to display a setting screen to select a desired item on the setting screen based on a predetermined operation, a plurality of items, including an item to select the intensity level of the process of reducing a mosquito noise, to be set to the processing unit being displayed as an option in the setting screen; and
    a control unit configured to generate the first control signal and the second control signal based on the item selected by the selection unit, supply the first control signal to the first part of the processing unit, and supply the second control signal to the second part of the processing unit.

2. A video signal processing apparatus according to claim 1, wherein the selection unit comprises:
    a setting screen display unit configured to display the setting screen based on a predetermined operation, a plurality of items to be set to the processing unit being displayed as an option in the setting screen; and
    an item selection unit configured to select the desired item on the setting screen based on a predetermined operation, the setting screen being displayed by the setting screen display unit.

3. A video signal processing apparatus according to claim 2, wherein the setting screen display unit is configured to reach the setting screen, on which a plurality of items to be set to the processing unit are displayed as an option, by a predetermined operation of entering the plurality of setting screens, each setting screen having a plurality of items as an option, the setting screens being formed by a hierarchical structure.

4. A video signal processing apparatus according to claim 2, wherein the setting screen display unit comprises:
    a first operation unit configured to display the setting screen which becomes a top of the hierarchy in the plural setting screens, each setting screen having a plurality of items as an option, the setting screens being formed by a hierarchical structure; and
    a second operation unit configured to select and determine the desired item on the displayed setting screen.

5. A video signal processing apparatus according to claim 1, wherein the setting screen in which the plurality of items to be set to the processing unit are displayed as an option is configured to include the item in which the noise reduction process is set in the off state with respect to the processing unit.

6. A video signal processing apparatus according to claim 1, wherein the receiving unit is configured to receive the video signal to which a compression coding and an expanding process are performed by an MPEG method.

7. A video signal processing method comprising:

receiving a video signal;

supplying the received video signal to a processing unit comprising a first part for receiving a first control signal for setting the processing unit to (i) an off state in which a process of reducing a mosquito noise is stopped or (ii) an on state in which the process of reducing a mosquito noise is performed, and a second part for receiving a second control signal for setting an intensity level of the process of reducing a mosquito noise, the processing unit performing the process of reducing a mosquito noise to the received video signal based on the first control signal and the second control signal;

displaying a setting screen to select a desired item on the setting screen based on a predetermined operation, a plurality of items, including an item to select the intensity level of the noise reduction process, to be set to the processing unit being displayed as an option in the setting screen;

generating the first control signal and the second control signal based on the selected item; and supplying the first control signal to the first part of the processing unit and supplying the second control signal to the second part of the processing unit.

8. The video signal processing method according to claim 7, further comprising:

displaying the setting screen based on a predetermined operation, a plurality of items to be set to the processing unit being displayed as an option in the setting screen; and selecting the desired item on the setting screen based on a predetermined operation.

9. The video signal processing method according to claim 8, wherein the setting screen, on which a plurality of items to be set to the processing unit are displayed as an option, is reached by a predetermined operation of entering the plurality of setting screens, each setting screen having a plurality of items as an option, the setting screens being formed by a hierarchical structure.

10. The video signal processing method according to claim 8, further comprising:

displaying the setting screen which becomes a top of the hierarchy in the plural setting screens, each setting screen having a plurality of items as an option, the setting screens being formed by a hierarchical structure; and selecting and determining the desired item on the displayed setting screen.

11. The video signal processing method according to claim 7, wherein the setting screen in which the plurality of items to be set to the processing unit are displayed as an option is configured to include the item in which the noise reduction process is set in the off state with respect to the processing unit.

12. The video signal processing method according to claim 7, wherein a compression coding and an expanding process were performed by an MPEG method on the received video signal.

* * * * *

UNITED STATES PATENT AND TRADEMARK OFFICE
CERTIFICATE OF CORRECTION

PATENT NO. : 7,755,702 B2 Page 1 of 1
APPLICATION NO. : 11/366425
DATED : July 13, 2010
INVENTOR(S) : Muto et al.

It is certified that error appears in the above-identified patent and that said Letters Patent is hereby corrected as shown below:

Claim 1, column 8, line 21, change "unit, based" to --unit based--.

Signed and Sealed this

Seventh Day of September, 2010

David J. Kappos
*Director of the United States Patent and Trademark Office*